(12) United States Patent
Wilson et al.

(10) Patent No.: US 8,640,796 B2
(45) Date of Patent: Feb. 4, 2014

(54) SOLAR-POWERED QUADRICYCLE WITH REGENERATIVE AND DISSIPATIVE BRAKING

(75) Inventors: Richard Wilson, Bakersfield, CA (US); Mary Jane Wilson, Bakersfield, CA (US); Jesse Frederick, Bakersfield, CA (US)

(73) Assignee: WZI, Inc., Bakersfield, CA (US)

( * ) Notice: Subject to any disclaimer, the term of this patent is extended or adjusted under 35 U.S.C. 154(b) by 15 days.

(21) Appl. No.: 13/470,176

(22) Filed: May 11, 2012

(65) Prior Publication Data

US 2013/0299251 A1 Nov. 14, 2013

(51) Int. Cl.
*B60K 16/00* (2006.01)
*B62M 1/02* (2006.01)

(52) U.S. Cl.
USPC .......... 180/2.2; 180/65.31; 280/212; 280/231

(58) Field of Classification Search
USPC ......... 180/2.2, 65.1, 65.21, 65.31; 188/24.16, 188/24.21, 79.54; 303/152; 280/212, 214, 280/231
See application file for complete search history.

(56) References Cited

U.S. PATENT DOCUMENTS

| | | | |
|---|---|---|---|
| 1,617,151 A | 2/1927 | Forsberg | |
| 4,227,589 A * | 10/1980 | Chika | 180/205.7 |
| 4,744,577 A | 5/1988 | Brent et al. | |
| 5,316,101 A * | 5/1994 | Gannon | 180/221 |
| 5,476,310 A * | 12/1995 | Ohtsu et al. | 303/3 |
| 5,489,002 A | 2/1996 | Streiff | |
| 5,713,590 A | 2/1998 | Clark | |
| 6,158,542 A * | 12/2000 | Nolet | 180/206.2 |
| 6,217,398 B1 | 4/2001 | Davis | |
| 6,554,308 B2 * | 4/2003 | Black | 280/231 |
| 6,874,592 B2 * | 4/2005 | Yokotani et al. | 180/206.2 |
| 7,017,685 B2 * | 3/2006 | Schoenberg | 180/2.1 |
| 7,021,978 B2 | 4/2006 | Jansen | |
| 7,946,373 B2 * | 5/2011 | Gibson | 180/206.5 |
| 8,120,308 B2 * | 2/2012 | Ward | 320/101 |
| 8,381,884 B2 * | 2/2013 | Watarai | 188/24.22 |
| 2008/0173490 A1 | 7/2008 | Itoh | |
| 2010/0116598 A1 | 5/2010 | Watarai | |
| 2011/0233994 A1 | 9/2011 | Harding et al. | |
| 2012/0022735 A1 * | 1/2012 | Tashiro et al. | 701/22 |

* cited by examiner

*Primary Examiner* — John Walters
(74) *Attorney, Agent, or Firm* — James M. Duncan, Esq.; Klein DeNatale Goldner

(57) ABSTRACT

A solar-powered vehicle with regenerative and mechanical braking includes a chassis or frame, a seat mounted to the frame, a rear axle rotatably supported on the frame, spaced apart left and right rear wheels mounted on the rear axle, and at least one front wheel mounted on the frame. The vehicle includes a selectively engageable regenerative braking system and a selectively engageable mechanical braking system. A lever for engaging the braking systems has three positions, wherein at a first position a reed switch on the lever engages a magnetic source, disabling the regenerative braking system. At a second position, the reed switch disengages the magnetic source, enabling the regenerative braking system. At a third position of the lever, the mechanical braking system is engaged.

3 Claims, 8 Drawing Sheets

SOLAR-POWERED QUADRICYCLE WITH REGENERATIVE AND DISSIPATIVE BRAKING

RELATED APPLICATIONS

Not Applicable.

BACKGROUND OF THE INVENTION

1. Field of the Invention

The present invention relates generally to a solar-powered vehicle, and more specifically to a solar-powered vehicle with multi-stage regenerative and mechanical braking.

2. Background

Transitioning away from petroleum-based energy sources has become a primary focus of research and development in the energy industry, as well as in industries that rely on petroleum fuels to power their products. Investment in alternative-fuel vehicles, for example, has skyrocketed in recent years.

In 2010 there were an estimated one billion vehicles in the world. The vast majority of these vehicles were gasoline-powered. Heavy reliance on petroleum-based fuels like gasoline presents a number of problems, and the major economies of the world are increasingly looking for ways to deal with, or prevent, these problems. Fossil fuel use has been identified as one of the largest contributors to air pollution around the globe. This pollution stems primarily from combustion of the fossil fuels, resulting in carbon monoxide, nitrogen oxide, hydrocarbon, and particulate emissions into the atmosphere. Carbon monoxide is highly toxic to air-breathing animals because of its interference with the ability of the blood to transport oxygen. Even small amounts of carbon monoxide can cause damage to cardiovascular tissue. Nitrogen oxides irritate the lungs and lead to acute respiratory disease, particularly in children. In addition to these direct harms, fossil fuel combustion is thought to be a major contributor to global climate change, resulting in innumerable indirect harms to humans and other species as temperatures around the globe increase. Use of petroleum fuels such as gasoline also results in evaporative emissions, which release fuel vapors into the atmosphere without combustion of the fuel.

Researchers looking into alternative fuel vehicles have explored a variety of options for moving vehicles away from a reliance on fossil fuels. These areas of research include battery/electric-powered vehicles, solar-powered vehicles, and vehicles powered by alternative fuels such as dimethyl ether (DME), ammonia, ethanol, biodiesel, biogas, hydrogen, and others. Each of these possible alternatives presents a variety of challenges and difficulties that must be overcome.

Solar-powered vehicles are known in the art. Such vehicles typically employ photovoltaic cells to convert energy from the sun into electric energy. Such vehicles have been largely impractical for day-to-day transportation. There are a number of factors that account for this impracticality. For example, power from a solar array is limited by the size of the photovoltaic array and the surface area of the photovoltaic array that is exposed to sunlight. This is, in turn, limited by the size of the vehicle itself. A larger vehicle, having more available space for photovoltaic cells, also requires more energy to move. Further, while batteries can be employed to store energy from the photovoltaic cells, the battery also adds to the overall weight of the vehicle. Photovoltaic panels are also heavy. In order to be useful, the energy supplied by a photovoltaic panel must be sufficient to offset the increased weight of the vehicle as a result of the panel.

Electric vehicles, such as solar-powered vehicles, can use regenerative braking to recapture, in useful form, some of the kinetic energy of the vehicle while slowing the vehicle. Regenerative braking is known in the art, and the energy obtained from such braking can be stored and used to provide power to the vehicle when necessary. Regenerative braking alone, however, is not sufficient to meet the braking needs of a vehicle. More traditional mechanical braking, such as dissipative braking, is also desired so that the operator of a vehicle can stop rapidly if required. Dissipative braking converts the kinetic energy of the vehicle into dissipative energy. Common examples of dissipative braking include disk brakes and drum brakes.

Control of two separate braking systems can provide a complex problem for the operator of a vehicle. In many vehicles, such as cars, computer systems control the interplay between the two braking systems, thereby reducing the burden on the operator of the vehicle. In simpler vehicles, where computerized control of braking systems is not desirable, control of the braking systems is left to the operator, who may have to rely on two separate mechanisms to control the individual braking systems. This adds a layer of complexity to the user's operation of the vehicle, and increases the risk of error on the part of the user.

What is needed, then, is a solar-powered vehicle that overcomes limitations in the art, providing a practical vehicle for day-to-day transportation. Also needed is such a vehicle wherein the regenerative and dissipative braking systems are easily controlled by the operator of the vehicle.

SUMMARY OF THE INVENTION

The present invention provides a solar-powered vehicle with regenerative and mechanical braking. In one embodiment of the invention, the vehicle includes a chassis or frame, at least one seat mounted to the frame, a rear axle rotatably supported on the frame, spaced apart left and right rear wheels mounted on the rear axle, and at least one front wheel mounted on the frame. A first chain drive assembly is coupled to the left rear wheel and a first pedal is associated with the first chain drive assembly. A second chain drive assembly is coupled to the second right rear wheel and a second pedal is associated with the second chain drive assembly. The vehicle includes a selectively engageable regenerative braking system and a selectively engageable mechanical braking system. A lever for engaging the braking systems has three positions, wherein at a first position a reed switch on the lever engages a magnetic source, disabling the regenerative braking system. At a second position, the reed switch disengages the magnetic source, enabling the regenerative braking system. At a third position of the lever, the mechanical braking system is engaged.

Another embodiment of the present invention further includes at least one photovoltaic cell supported on the frame. A motor in electrical communication with the photovoltaic cell is operatively coupled to at least one wheel of the vehicle.

In another embodiment of the present invention, at least one of the chain drive assemblies is a multi-geared chain drive. A gear selector is provided for adjusting the ration of the chain drive.

Another embodiment of the present invention provides a vehicle having regenerative and mechanical braking. The vehicle includes a braking controls for selectively engaging the braking systems, the braking control having a first position, a second position, and a third position. At the first position, neither of the mechanical or regenerative braking systems is engaged. At the second position, the regenerative braking system is engaged. At the third position, the mechanical braking system is engaged. A battery is in electrical communication with the regenerative braking system. At least one photovoltaic cell is in communication with the battery. The photovoltaic cell and the regenerative braking system are operable to charge the battery.

DETAILED DESCRIPTION OF THE INVENTION

Figure 1:
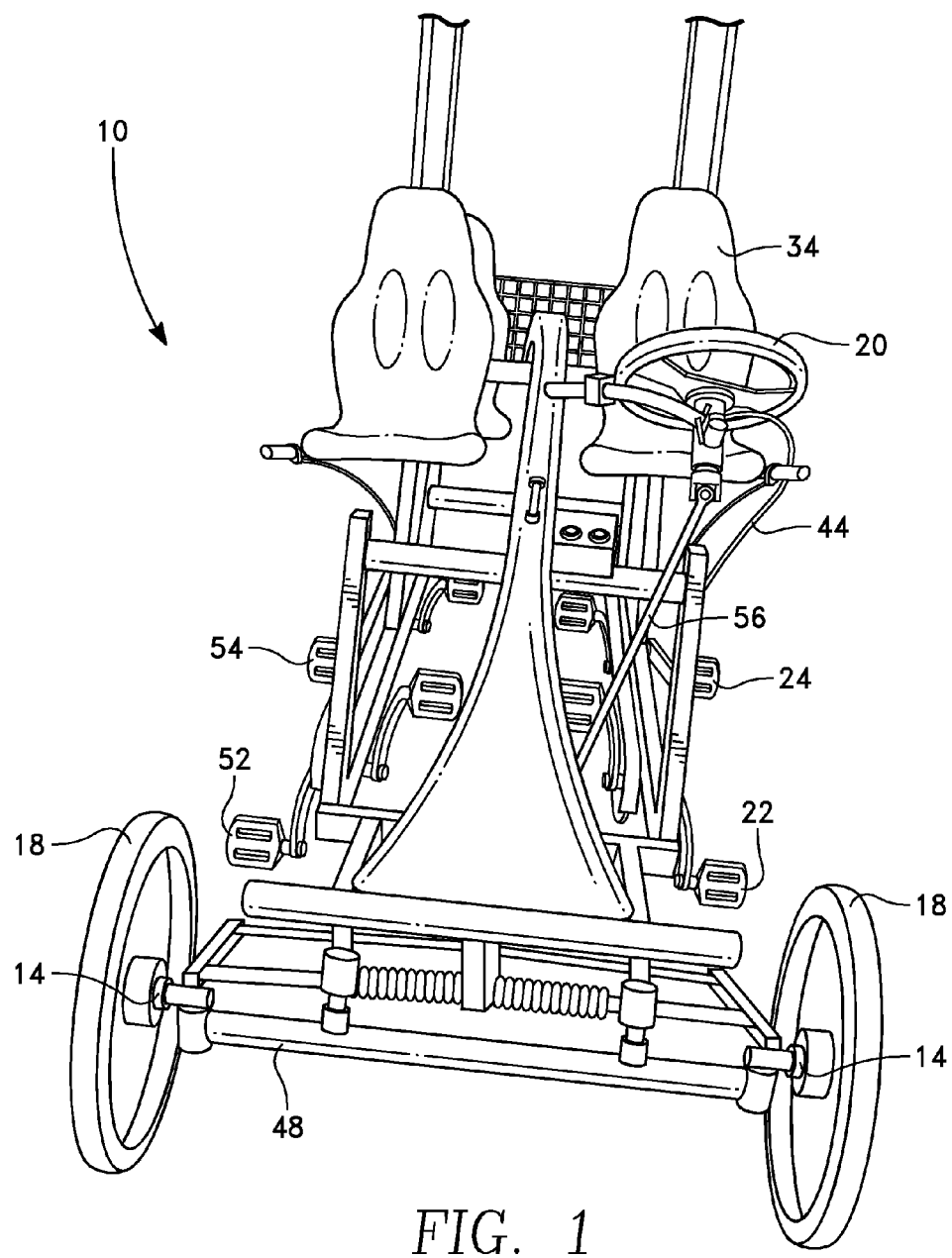
FIG. 1 is a front perspective view of one embodiment of a vehicle of the present invention.

Turning now to the drawings, wherein like numeral indicate like parts, the numeral 10 refers generally to one embodiment of vehicle 10 of the present invention. The embodiment of vehicle 10 shown in the drawings includes, generally, a frame or chassis 12, the chassis 12 having a pair of front stub axles 14 and a pair of rear stub axles 16 associated therewith. Front stub axles 14 and rear stub axles 16 are, in turn, each associated with a wheel 18 that rotates along with the rotational movement of a respective axle. Vehicle 10 further includes first chain drive assembly 26 and second chain drive assembly 28, first chain drive assembly 26 being powered by first pedals 22 and second pedals 24, and second chain drive assembly being powered by third pedals 52 and fourth pedals 54.

Other components of the present invention are also shown in FIG. 1. For example, steering wheel 20 is shown connected to steering shaft 56. It is to be understood that a variety of mechanisms for steering a vehicle are known to those of skill in the art, and that any suitable mechanism may be provided for steering the present device. FIG. 1 also shows a brake cable 44 for actuation of a mechanical, or dissipative, braking system of the present invention, described in greater detail below.

Figure 2:
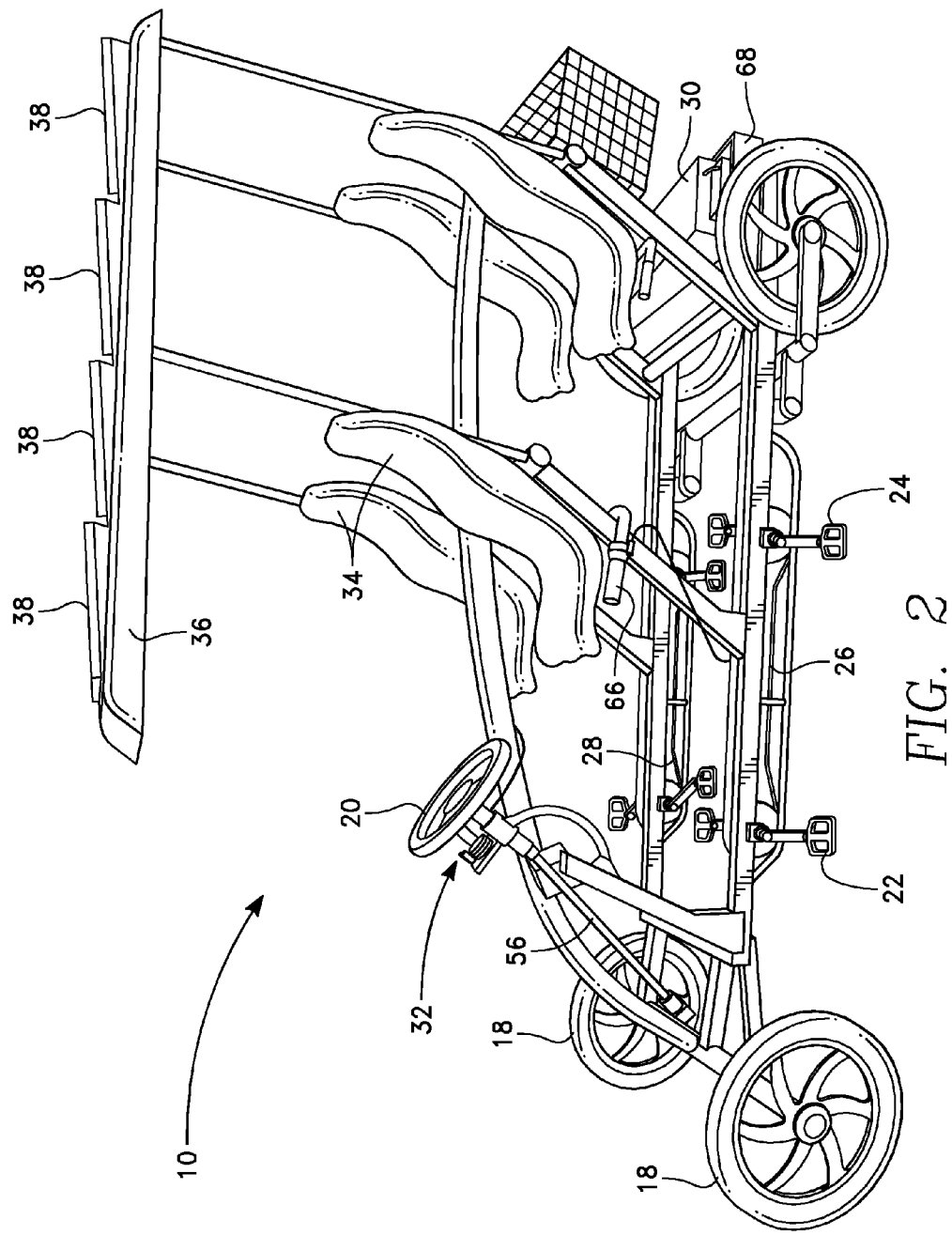
FIG. 2 is a driver's side perspective view of one embodiment of a vehicle of the present invention.
Figure 7:
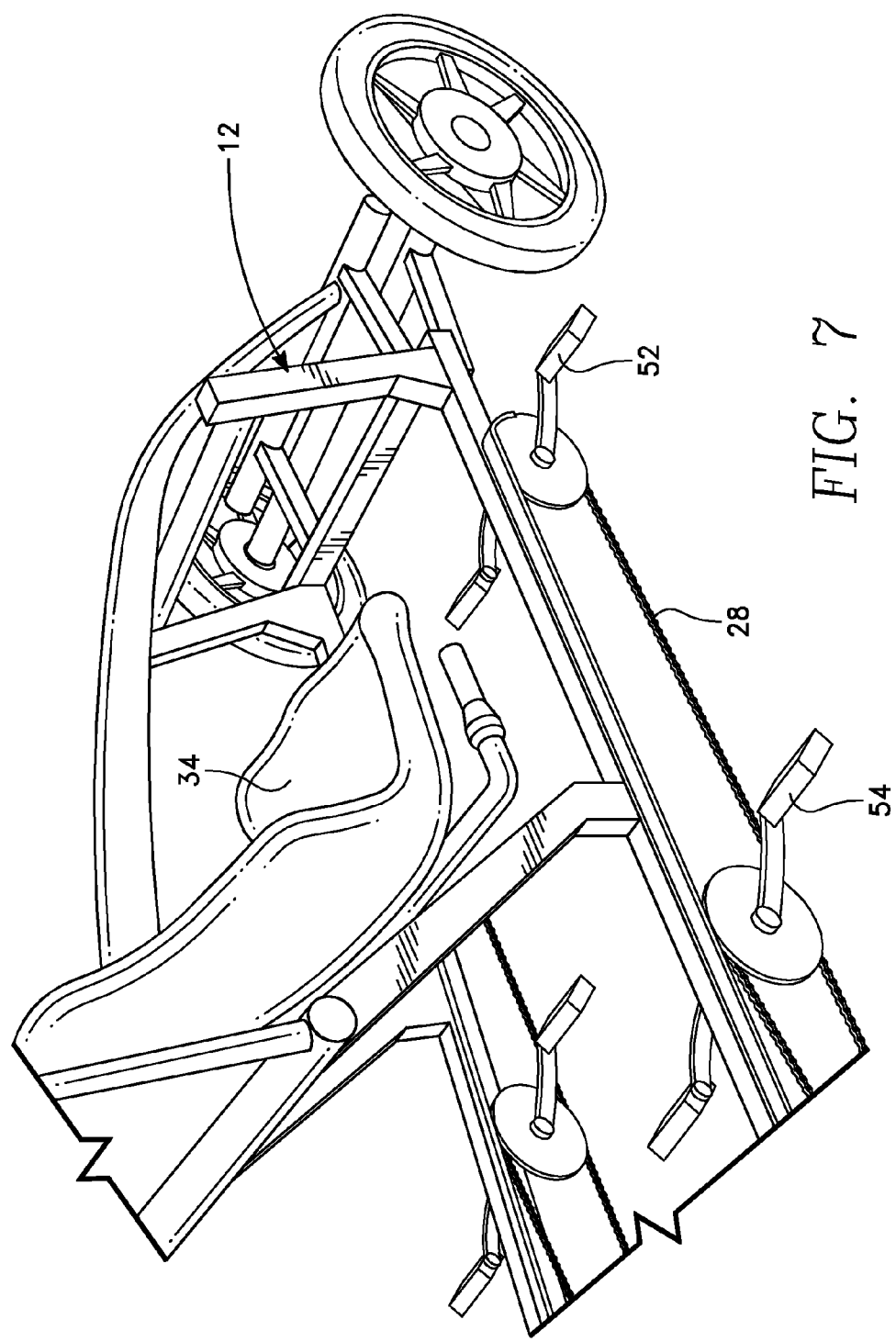
FIG. 7 is a passenger side perspective view of one embodiment of a vehicle of the present invention.

Steering wheel 20 is also shown in FIG. 2, steering wheel 20 being associated with steering shaft 56 for steering of vehicle 10. Also shown is canopy 36, supported above vehicle 10 by a plurality of supports 62. Canopy 36 provides a surface onto which photovoltaic panels 38 may be disposed, thereby providing sufficient space for generation of electrical energy from solar energy. The device shown in FIGS. 1 and 2 is shown from a passenger-side perspective in FIG. 7.

Chain Drive Assembly

Use of a chain drive in operator-powered vehicles is well known in the art. Chain drives may be provided with or without a gear system. The use of gears allows the user of the vehicle to change the ratio of revolutions of the pedals to revolution of the tires, allowing the user to adapt the chain drive to specific situations as necessary or desired. When climbing hills, for example, the gear mechanism may be used to allow many pedal rotations to a single wheel rotation. When traveling downhill, the opposite may be true, with the gear setting allowing many rotations of the wheel for a single rotation of the pedals.

Many pedal-powered vehicles use external "derailleur" gearing. The operator may use a lever, twist grip, or combination of the two to change the tension in the chain on the chain drive. This change in tension causes the chain to move (or derail) from one sprocket to another, thereby changing the gear ration of the vehicle. This type of gearing generally requires that the operator of the vehicle be pedaling when gears are shifted. Other types of gearing mechanisms are also known in the art, some of which are internal or are a combination of internal and external gearing. It is contemplated that any suitable gearing mechanism may be used in conjunction with the present invention.

FIG. 2 is a driver's side perspective view of one embodiment of a vehicle 10 of the present invention. First chain drive assembly 26 is visible, as is second chain drive assembly 28. Two sets of pedals, first pedals 22 and second pedals 24, are shown in association with first chain drive assembly 26, such that when either of first pedals 22 or second pedals 24, or both, is operated, first chain drive assembly 26 is engaged and the rear driver's side wheel 18 of vehicle 10 is caused to rotate. This rotational movement of the wheel 18, of course, causes a corresponding movement of vehicle 10. Chain drive assemblies are known in the art and are available in a variety of forms, differing in gear speeds available to the operator, and the like. It is contemplated that any suitable chain drive assembly may be used in conjunction with the present vehicle 10.

FIG. 2 also depicts a twist grip 66 used for changing the gear ratio of the present vehicle 10. As noted above, the gearing system of the vehicle 10 may be any suitable gearing system. Although a twist grip 66 is shown in conjunction with the embodiment of vehicle 10 shown in the drawings, it is contemplated that a lever or other suitable mechanism for changing gears may be utilized. FIG. 2 depicts vehicle 10 as seen from the driver's side, and twist grip 66 controls the gearing of the driver's side chain drive. It is contemplated that a twist grip or other gear control mechanism is likewise used to control gearing on the driver's side.

Braking

Figure 3:
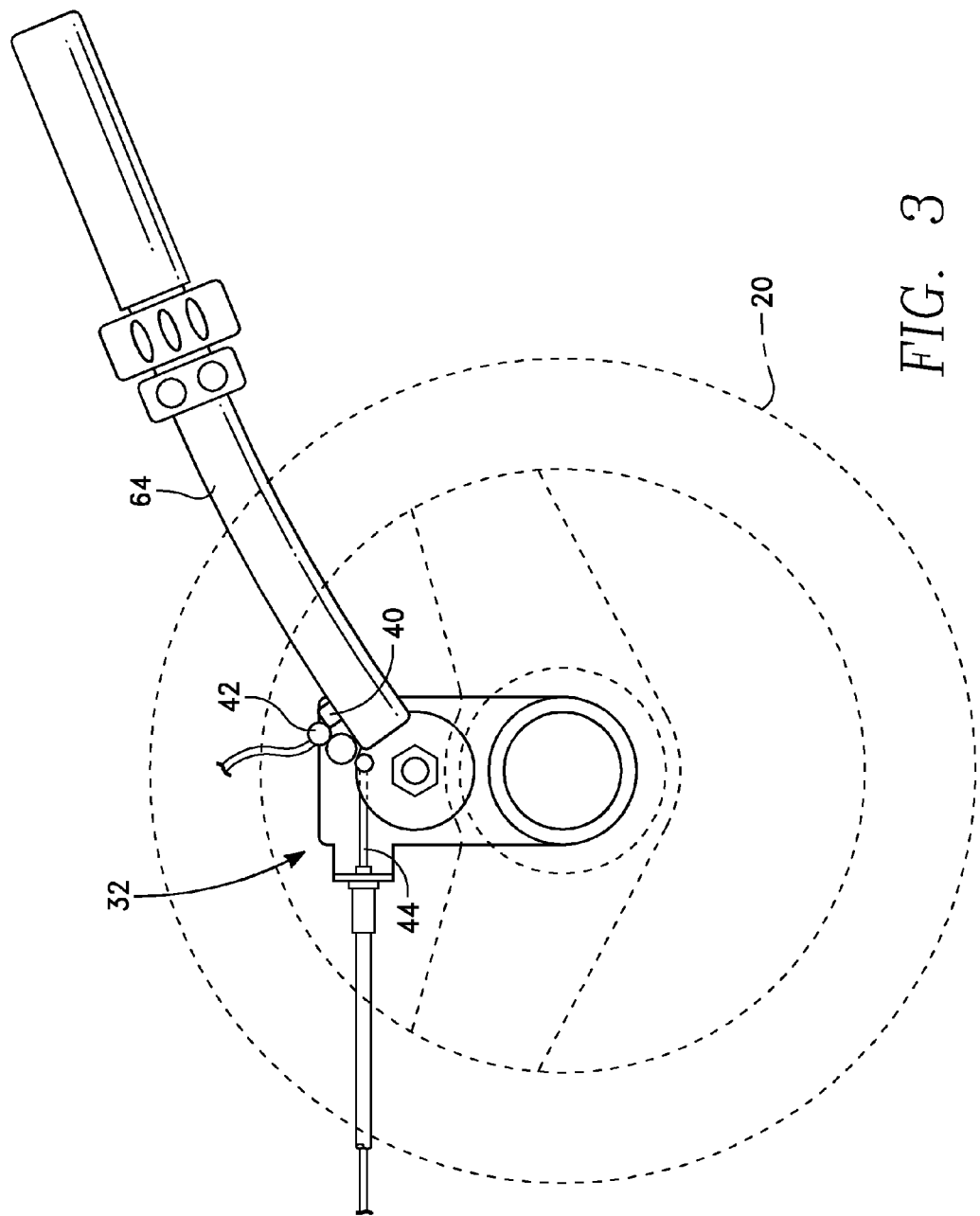
FIG. 3 is a perspective view of one embodiment of a selectively engageable braking control of the present invention, the braking control shown in a first position.

FIG. 3 provides a close perspective view of one embodiment of a selectively engageable braking control 32 of the present invention, the braking control being shown with lever 64 in a first position. In the embodiment shown in the figure, selectively engageable braking control 32 includes a lever 64, the lever having a magnetic source 40 affixed thereto. Selectively engageable braking control 32 also preferably includes a reed switch 42 disposed such that lever 64 can be pivoted to bring magnetic source 40 into contact with reed switch 42 when lever 64 is in a first position as shown in the Figure. As described below, lever 64 can also be pivoted to disengage magnetic source 40 from reed switch 42.

Figure 4:
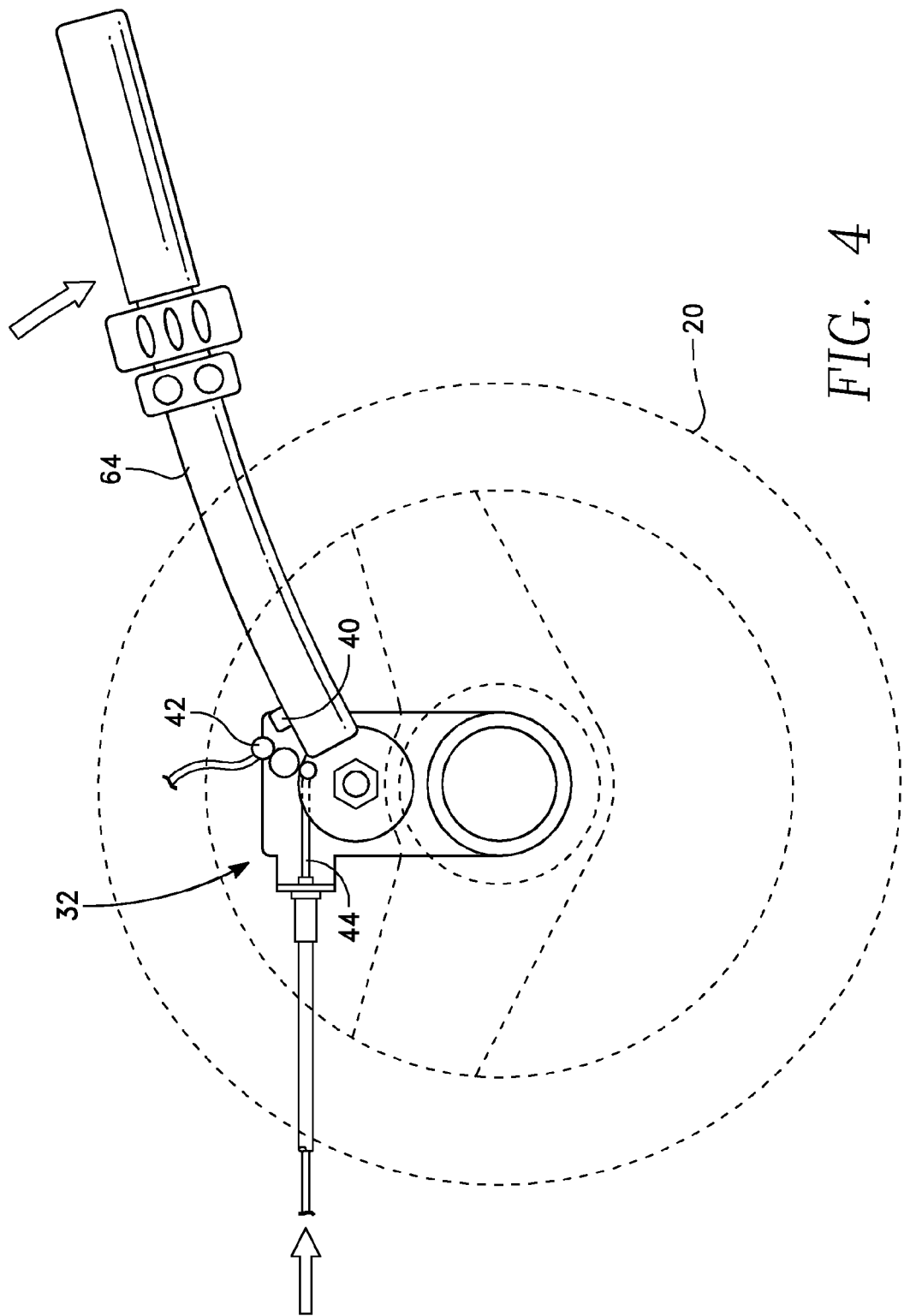
FIG. 4 is a perspective view of one embodiment of a selectively engageable braking control of the present invention, the braking control shown in a second position.

FIG. 4 shows the selectively engageable braking control 32 of FIG. 3, where lever 64 is in a second position. In the second position, the magnetic source 40 is disengaged from the reed switch 32, but braking control 32 is not pulled back sufficiently to engage the mechanical braking system. This disengagement of the magnetic source 40 from reed switch 42 results in activation of the regenerative braking system of vehicle 10. The regenerative braking system slows vehicle 10 as the kinetic energy of vehicle 10 is converted to electrical energy. The method by which regenerative braking systems operate is known in the art. In some instances, use of the regenerative braking system may be sufficient to meet the needs of the vehicle operator. In other situations, the operator may desire a more rapid or complete slowing, in which case the selectively engageable braking control 32 can be utilized to engage the dissipative braking system of vehicle 10.

Figure 5:
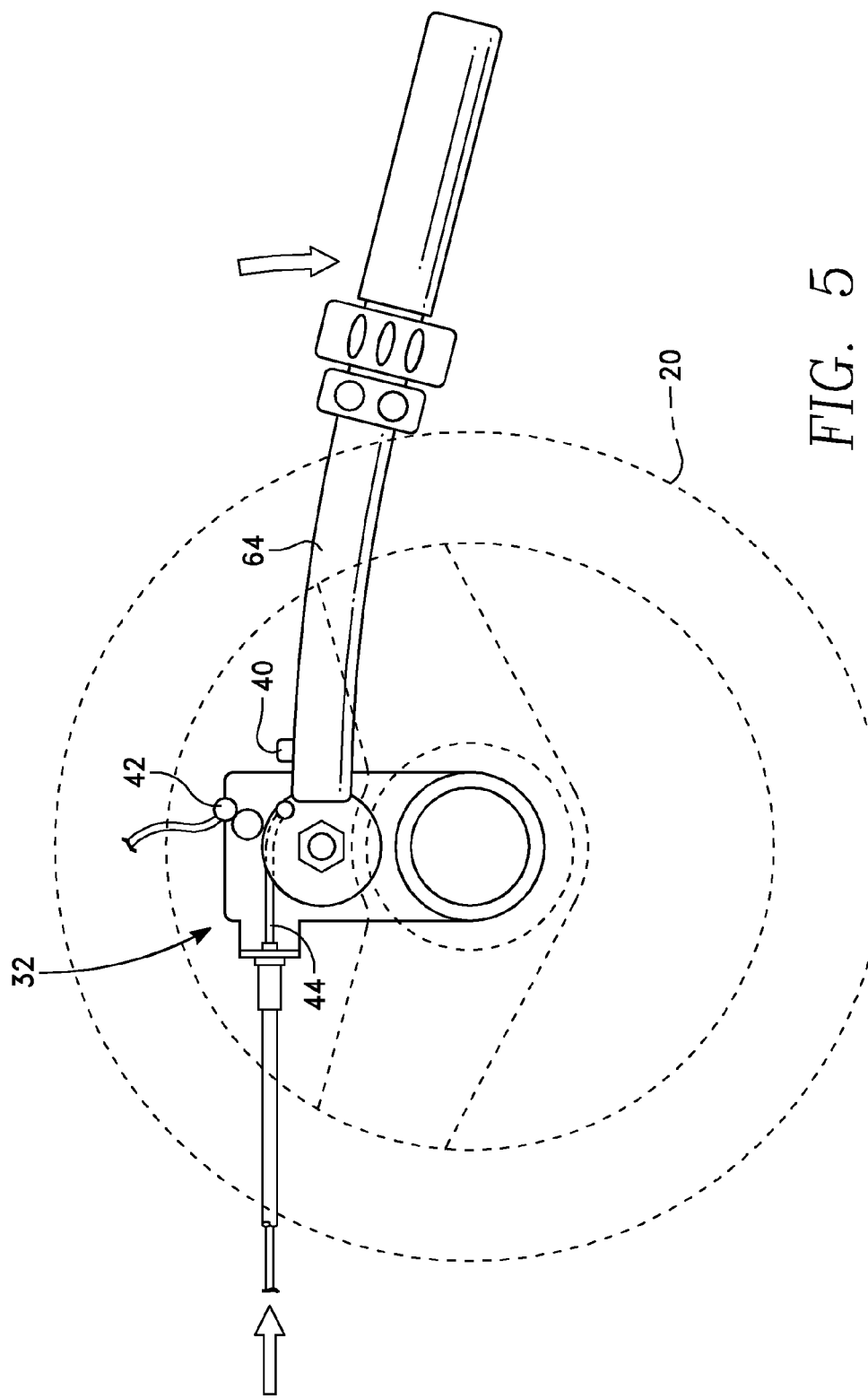
FIG. 5 is a perspective view of one embodiment of a selectively engageable braking control of the present invention, the braking control shown in a third position.

FIG. 5 shows engagement of the dissipative braking system of vehicle 10 using selectively engageable braking control 32. When braking control 32 is moved to a third position, as shown in the figures, tension is increased on brake cable 44, thereby engaging the dissipative braking system of vehicle 10. The mechanism by which such braking systems operate is well known in the art.

Although the embodiment of vehicle 10 described above and shown in the drawings employs a reed switch for selective engagement of the regenerative braking system, it is contemplated that any suitable switching mechanism may be used. Further, in embodiments wherein a reed switch is employed, the reed switch may be provided in either a normally-open or normally-closed state.

Power System

The embodiment of vehicle 10 shown in the drawings relies on solar and battery power, in addition to operator-provided power and the above-described chain drive, to propel vehicle 10 forward. Photovoltaic cells are known in the art. In such cells, sunlight impacts the solar panel and is absorbed by a semi-conducting material. Current is captured and can be utilized or stored in a battery for later use. Wiring photovoltaic cells to provide useful energy is also known in the art. Wiring may be done in one of three forms: 1) serial; 2) parallel; or 3) a combination of serial and parallel wiring. When wired in series, the positive terminal of one photovoltaic cell is connected to the negative terminal of the next photovoltaic cell. The voltage produced by each of the photovoltaic cells is additive, while the current remains constant across the system. With parallel wiring, the positive terminal of the first photovoltaic cell is connected to the positive terminal of the second photovoltaic cell, and the negative of the first photovoltaic cell is connected to the negative of the second photovoltaic cell. When wired in series, the current of the photovoltaic cells is additive while the voltage remains constant. When a combination arrangement is desired, groups of photovoltaic cells wired in series may be wired together in parallel fashion. It is contemplated that any suitable wiring scheme may be used in conjunction with the present invention.

Use of a rechargeable battery is also known in the art, and it is contemplated that wiring one or more photovoltaic cells to charge such a battery is within the capabilities of one of ordinary skill in the art. A variety of batteries are available for such purposes, including lead-acid batteries, nickel metal hydride batteries, and lithium-ion batteries. Lead-acid batteries may include varieties in which the electrolyte is gelled to reduce the risk of spillage, or in which the electrolyte is absorbed in a fiberglass mat separator. Both such batteries fall into the broad category of valve-regulated lead-acid batteries.

Figure 6:
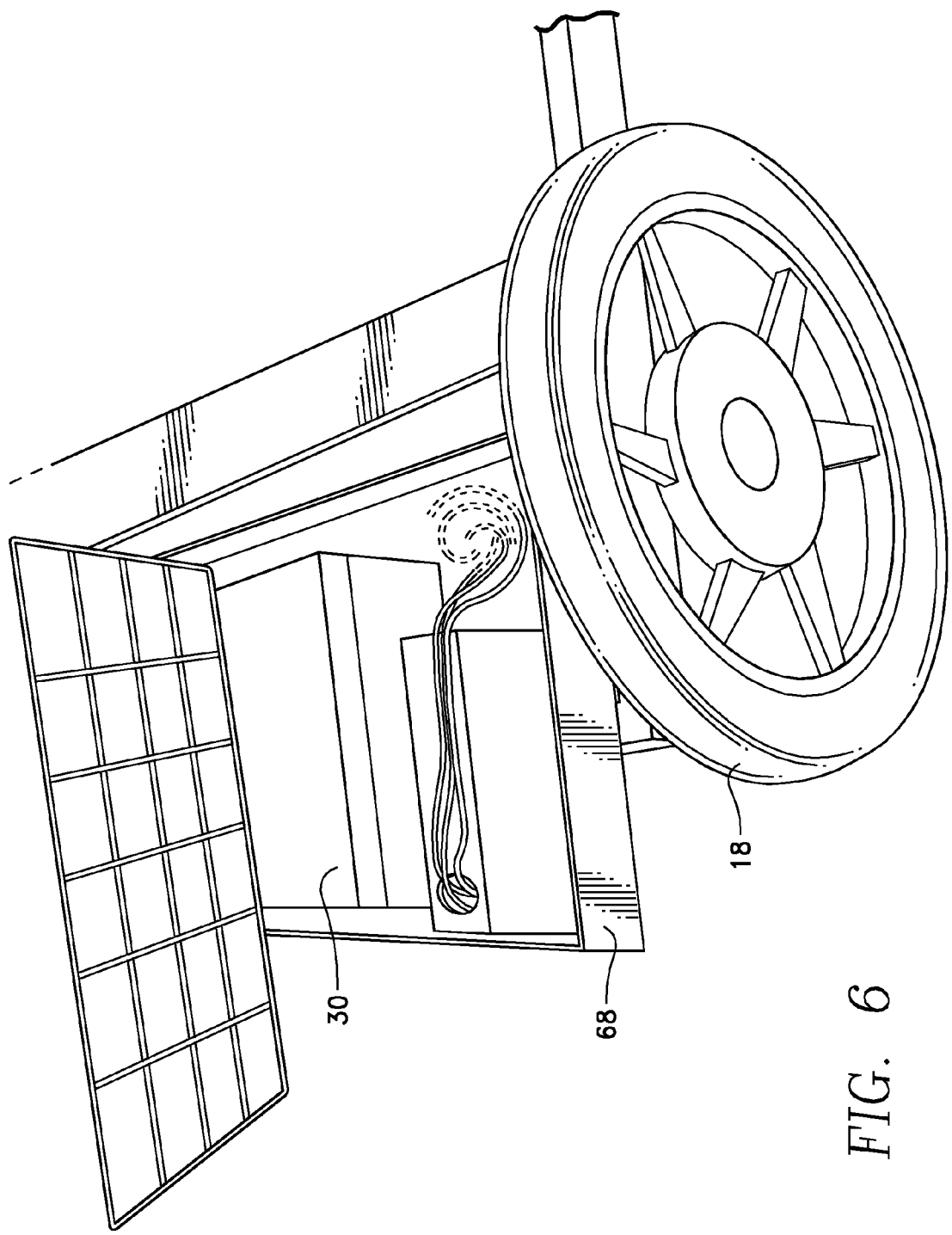
FIG. 6 is a perspective view of a rear portion of one embodiment of a vehicle of the present invention, the figure showing a placement of a battery associated with the vehicle.

FIG. 2 shows photovoltaic cells 38 positioned on canopy 36 of vehicle 10. Although a plurality of photovoltaic cells 38 are shown in FIG. 2, it is contemplated that a single, larger photovoltaic cell may be utilized. As best shown in FIG. 6, a rechargeable battery 30 is provided in a rear bin 68 mounted firmly on chassis 12 of vehicle 10. The wiring from photovoltaic cells 38 to rechargeable battery 30 is not shown, however is it contemplated that one of ordinary skill in the art, having read this disclosure, would be able to wire the photovoltaic cells 38 and rechargeable batter 30 without undue experimentation.

It is further contemplated that an electric motor be used in association with vehicle 10, the electric motor converting electrical energy from battery 30 and/or photovoltaic cells 38 into mechanical energy to propel the vehicle. The electric motor may be engaged in addition to, or separately from, the chain drive assembly described above. Use of an electric motor to propel a vehicle is known in the art, and it is contemplated that any suitable motor may be used in conjunction with the present invention.

Figure 8:
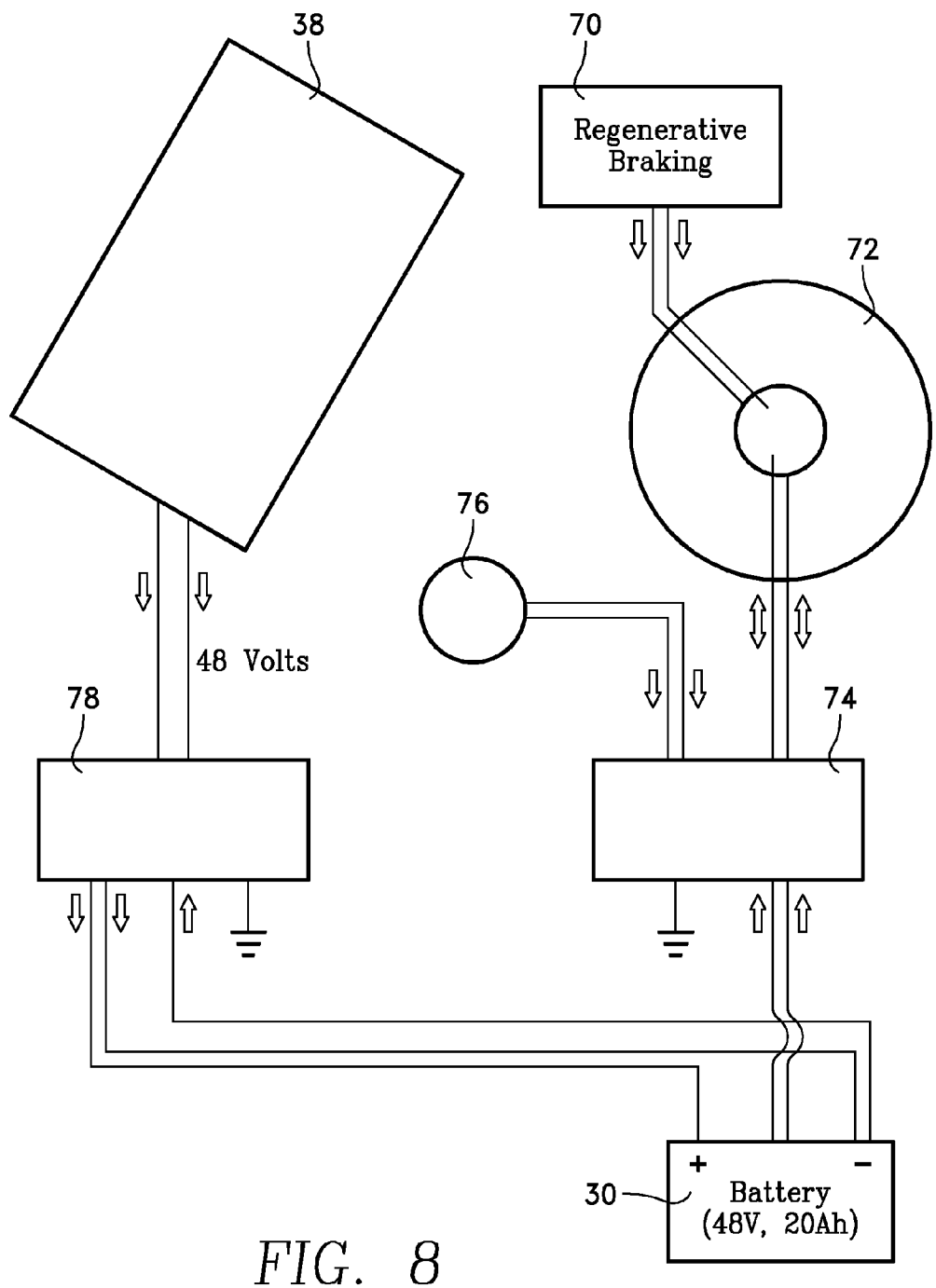
FIG. 8 is a wiring diagram showing exemplary wiring of one embodiment of the present invention.

FIG. 8 provides an exemplary wiring diagram of one embodiment of the present invention. As can be seen, a motor controller 74 is provided for control of hub motor 72, and in electrical communication with "throttle" or accelerator 76. Motor controller 74 may be provided with a wide range of functionality, including manual or automatic means for starting and stopping the vehicle, selecting forward or reverse rotation, regulating the speed of the device, regulating the torque, and protecting against overloads and faults. A variety of motor controller 74, ranging from the simple to the complex, may be provided with the present invention.

Hub motors, such as hub motor 72, are known in the art. Hub motor 72 may include brushes for energy transfer, or may be brushless. Regenerative braking system 70 communicates electrically with hub motor 72. Also shown in FIG. 8 is battery 30, as well as solar controller 78 which controls current from solar panels 38 as well as to and from battery 30.

The embodiments of the present invention described above and shown in the drawings are exemplary and are not intended to limit the present invention. Numerous modifications and alternative embodiments relating to the present invention will be readily apparent to those of skill in the art upon reading this disclosure. It is contemplated that such modifications and alternative embodiments fall within the spirit and scope of the present invention.

Having thus described the preferred embodiment of the invention, what is claimed as new and desired to be protected by Letters Patent includes the following:

1. A vehicle comprising:
 a frame;
 at least one seat supported by said frame;
 a rear axle rotatably supported on the frame;
 spaced apart left and right rear wheels mounted on the rear axle;
 at least one front wheel mounted on the frame;
 a first chain drive assembly coupled to the left rear wheel;
 a first pedal associated with the first chain drive assembly for operation of the first chain drive assembly by a user of the vehicle;
 a second chain drive assembly coupled to the right rear wheel;
 a second pedal associated with the second chain drive assembly for operation of the second chain drive assembly by a user of the vehicle;
 a selectively engageable regenerative braking system coupled to a wheel of the vehicle for capturing a rotational energy of said wheel, thereby slowing the vehicle;
 a selectively engageable mechanical braking system coupled to a wheel of the vehicle for slowing the vehicle;
 a lever for engaging said regenerative braking system and said mechanical braking system, the lever mounted to the frame of the vehicle,
 wherein, at a first position of said lever, a reed switch mounted on said lever engages a magnetic source mounted on said frame, the regenerative braking system of the vehicle being disabled, and at a second position of said lever, the reed switch mounted on said lever disengages the magnetic source, thereby enabling the regenerative braking system, and at a third position of said lever, the mechanical braking system of the vehicle being engaged.

2. The vehicle according to claim 1 further comprising:

at least one photovoltaic cell supported on said frame; and a motor in electrical communication with said at least one photovoltaic cell, the motor operatively coupled to at least one wheel of said vehicle to propel said vehicle when said motor is in operation.

3. The vehicle according to claim 1 wherein at least one of said chain drive assemblies comprises a multi-geared chain drive, the vehicle further comprising a gear selector for adjusting the gear ratio of the chain drive.

\* \* \* \* \*